United States Patent [19]

Stadnick et al.

[11] Patent Number: 5,030,524

[45] Date of Patent: Jul. 9, 1991

[54] BATTERY CELL STACK HAVING EXTENDED LIFE

[75] Inventors: Steven J. Stadnick, Redondo Beach; Howard H. Rogers, Torrance, both of Calif.

[73] Assignee: Hughes Aircraft Company, Los Angeles, Calif.

[21] Appl. No.: 299,118

[22] Filed: Jan. 19, 1989

[51] Int. Cl.⁵ .............................................. H01M 4/00
[52] U.S. Cl. ........................................ 429/66; 429/101
[58] Field of Search ................................ 429/66, 101

[56] References Cited

U.S. PATENT DOCUMENTS

| | | | |
|---|---|---|---|
| 2,906,805 | 9/1959 | Zahn | 429/66 |
| 4,477,540 | 10/1984 | Miller et al. | 429/66 X |
| 4,683,178 | 7/1987 | Stadnick et al. | 429/101 |
| 4,820,597 | 4/1989 | Lim et al. | 429/101 X |

FOREIGN PATENT DOCUMENTS

| | | | |
|---|---|---|---|
| 2448068 | 4/1976 | Fed. Rep. of Germany | 429/66 |
| 55-119343 | 9/1980 | Japan | 429/66 |

*Primary Examiner*—Stephen J. Kalafut
*Attorney, Agent, or Firm*—Robert A. Westerlund; Steven M. Mitchell; W. K. Denson-Low

[57] ABSTRACT

A deformable element is placed between the active plate sets of a storage battery to accommodate, by permanent compressive deformation, the swelling that occurs in the positive electrode of the plate set during extended cycling of the storage battery. The plate sets are normally supported on a core under axial compressive loading, and the swelling would otherwise deform or place a strain on the electrode connector leads, which could cause them to fail by shorting. The deformable element, preferably a modified polypropylene screen that permits the release of gas from the electrode and also is deformable in the direction perpendicular to the screen, compressively deforms to absorb the gradually increasing swelling of the positive electrode. The loading on the electrode connectors is thereby avoided or minimized, removing a major potential cause of failure.

7 Claims, 2 Drawing Sheets

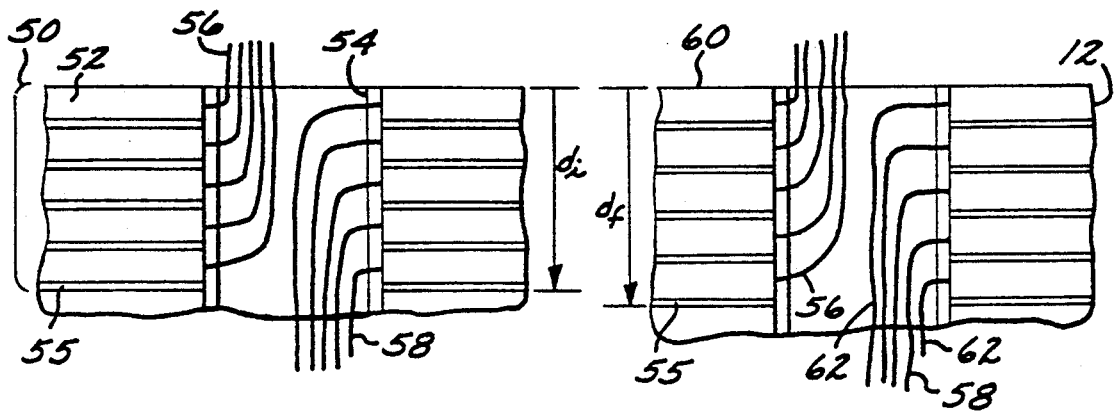
FIG.3A
(PRIOR ART)
FIG.3B
(PRIOR ART)
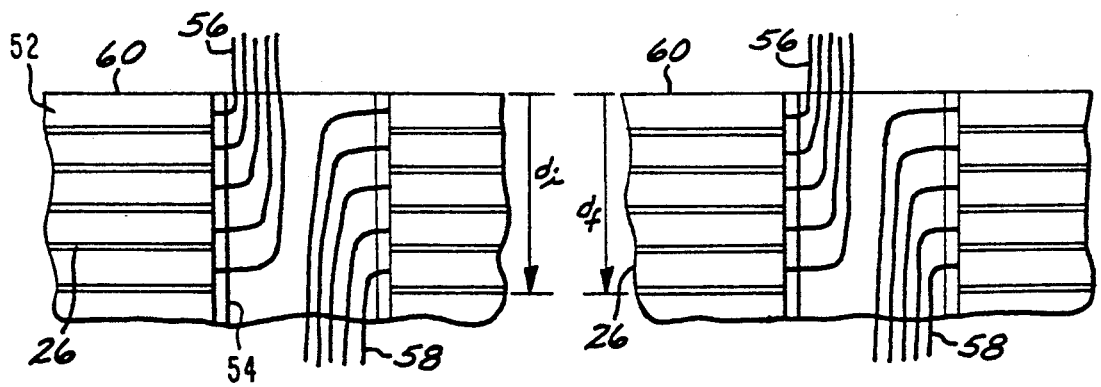
FIG.4A
FIG.4B

BATTERY CELL STACK HAVING EXTENDED LIFE

BACKGROUND OF THE INVENTION

This invention relates to electrical storage cells utilizing a plurality of facing and contacting plate sets, and, more particularly, to a structure that prolongs the operating lives of such cells.

Rechargeable cells or batteries are electrochemical devices for storing and retaining an electrical charge and later delivering that charge for useful power. Familiar examples of the rechargeable cell are the lead-acid cell used in automobiles, and the nickel-cadmium cell used in various portable electronic devices. Another type of cell having a greater storage capacity for its weight is the nickel oxide pressurized hydrogen cell, known as the nickel-hydrogen cell, which is used in spacecraft applications.

The nickel-hydrogen cell includes a series of active plate sets which store a charge electrochemically and later deliver that charge as a useful current, packaged within a pressure vessel that contains the plate sets and the hydrogen gas that is an essential active component of the cell. Each plate set includes a positive electrode, a negative electrode, and a separator between the two electrodes which is impregnated with an electrolyte. In a typical cell, about 40 plate sets are supported on a core under a light compressive loading, with a gas distribution screen between each plate set and with electrical connector leads extending to each electrode of each plate set. A nickel-hydrogen storage cell delivers current at about 1.3 volts, and a number of the cells are usually connected in series to produce current at the voltage required by the systems of the spacecraft.

A nickel-hydrogen cell used in a satellite is periodically charged by electrical current produced by solar panels on the spacecraft when the satellite is in sunlight, and then later discharged to supply electrical power, when the spacecraft is in shadow or peak electrical power is demanded. A satellite in a low earth orbit may experience up to about 6,000 cycles from sunlight to eclipse conditions per year, with a corresponding number of cycles of charging and discharging the cells. A typical accepted industry design objective is attaining satisfactory operation through 30,000 cycles of charging and discharging, corresponding to an operating life of 5 years for the satellite in low earth orbit, or more years in other orbits where fewer battery cycles are experienced annually.

The preferred positive electrode of the plate set in a nickel-hydrogen battery is made of sintered nickel powder impregnated with the active material nickel oxide. The inventors have observed that the positive electrode gradually swells as the number of cycles increases. By way of illustration of the magnitudes involved, a typical nickel positive electrode is initially about 0.030 inches thick, and each plate set is about 0.042 inches thick. After cycling between fully charged and 80 percent discharged states for 8000 cycles, the positive electrode swells to a thickness of about 0.045 inches, a 50 percent growth in thickness, with a corresponding growth of thickness of the plate set.

Each electrode has an electrode connector lead that provides the electrical connection to the voltage regulator electronics external to the storage cell. The connector leads are tightly packed within the core, and when significantly deformed may cause a short circuit, or one or more of the leads may break. The swelling of the positive electrodes causes the entire plate set to expand along the core, thereby causing the entire plate stack of many plate sets to displace along the core by an amount that is cumulative along the core. Some of the connector leads are potentially subject to large deformations, as much as 0.5 inches in a typical cell. The core itself may be deformed or broken by the stresses thereby created. The large deformations result in short circuits or failures.

The short circuiting and potential failure of the connector leads, and failure of the core, are limiting factors in the life of spacecraft batteries. There exists a need for an approach to avoiding, or at least minimizing, the adverse effects of the swelling observed in the presently used positive electrodes. The present invention fulfills this need, and further provides related advantages.

SUMMARY OF THE INVENTION

The present invention provides a structure for a cell stack and cell that resists internal damage resulting from swelling of the positive electrode during extended periods of cycling between charged and partially (or fully) discharged states. The structure reduces or eliminates the net deformation introduced into the cell stack by each plate set, so that there is little or no cumulative displacement of the entire cell stack. The important consequence of the reduced cumulative deformation is the reduction of the possibility of core failure and short circuiting the connector leads during extended periods of cycling. The likelihood of failure by stress, strain, fatigue, or stress corrosion mechanisms of the core and/or the connector leads is also greatly reduced. The potential cycle lifetime of the cell is thereby increased.

In accordance with the invention, a plate set stack used in an electrical storage cell comprises a plurality of active plate sets, each plate set including a positive electrode, a negative electrode, and a separator between the positive electrode and the negative electrode; and a deformable element disposed between at least some of the plate sets, the element being compressively deformable to accommodate the permanent swelling in each of the plate sets that occurs during extended cycling of the cell.

The invention also includes a cell made using such a plate set stack. In accordance with this aspect of the invention, an electrical storage cell having an extended life under conditions of repeated cycling between charged and discharged states comprises a plurality of active plate sets, each plate set including a positive electrode, a negative electrode, and a separator between the positive electrode and the negative electrode; a support upon which the plate sets are supported in a face to face relationship, under axial compressive loading; and accommodation means for accommodating deformation disposed between at least some of the plate sets on the core, the accommodation means including a deformation element that is deformable to accommodate the permanent expansion in the plate sets that occurs during extended cycling of the cell. The cell preferably includes a pressure vessel that contains the plate sets, the support, and the accommodation means.

In a specific embodiment, an electrical storage cell having an extended life under conditions of repeated cycling between charged and discharged states comprises a plurality of active plate sets, each plate set including a nickel positive electrode, a hydrogen negative electrode, and a separator between the positive electrode and the negative electrode; a core upon which the plate sets are supported under axial compressive loading; a deformable element disposed between each of the plate sets on the core, the element being compressively deformable to accommodate the permanent swelling in each of the plate sets that occurs during extended cycling of the cell; and a pressure vessel that contains the plate sets, the core, and the deformable element. The preferred storage cell of this type is a nickel-hydrogen storage cell.

The plate stack and storage cell of the present invention are similar to their more conventional counterparts, except that a deformable element (or, more generally, an accommodation means) is placed between at least some, and preferably all, of the plate sets of the plate stack. The entire plate stack remains under a compressive load and strain applied at the opposing ends of the stack, during the entire cycling life. However, the additional load and internal strain that would otherwise be created by the expansion of the positive electrode of each plate set is attenuated and accommodated by the deformable elements placed between the plate sets.

This approach is to be distinguished from an alternative possible approach, that of applying a greater compressive loading at the ends of the stack, or a resilient means at the ends of the stack. Such a greater compressive loading would require stronger structure for the battery, and consequently greater weight. It would also be largely ineffective in preventing internal cumulative deformation of the stack. Such cumulative deformation is the cause of short circuiting or failure of the connector leads. A resilient means such as a spring at the end of the stack would not avoid the internal displacement that is the cause of failure.

The deformable element can be any suitable deformable material placed between the plate sets. In prior plate stack construction, a substantially rigid, nondeformable polypropylene screen has been placed between the plate sets so that gas generated at the electrodes can escape from the stack. It has been found that a modification to the polypropylene screen as previously used permits the escape of gas and also provides the deformation function required of the deformable element. In the present approach, the rigid screen is replaced by one that creeps under applied loads. As each positive electrode swells, it increases the compressive loading of the stack. In response to the increased compressive loading in the stack, the deformable screen compresses, so that the total length of the combination of plate set and deformable element remains approximately constant. There is therefore no cumulative deformation from one end of the plate set stack to the other, and no large stresses or strains applied to the connector leads. Short circuiting of the leads is avoided, as is the potential for failure of the leads.

The present approach permits use of generally the same construction techniques as used with prior plate stacks and cells, except that the rigid and undeformable screen is replaced with a screen or other element that is deformable to accommodate the swelling of the positive electrode. Other features and advantages of the invention will be apparent from the following more detailed description, taken in conjunction with the accompanying drawings, which illustrate, by way of example, the features of the invention.

BRIEF DESCRIPTION OF THE DRAWINGS

FIG. 3 is a schematic sectional view of another detail of FIG. 1, showing the relationship of the plate sets and the connector leads (a) before and (b) after swelling of the positive electrodes, in the absence of a deformable element between each plate set; and FIG. 4 is a view similar to that of FIG. 3, showing the relationship of the plate sets and the connector leads (a) before and (b) after swelling of the positive electrodes, except with a deformable element inserted between the plate sets.

DETAILED DESCRIPTION OF THE PREFERRED EMBODIMENT

Figure 1:
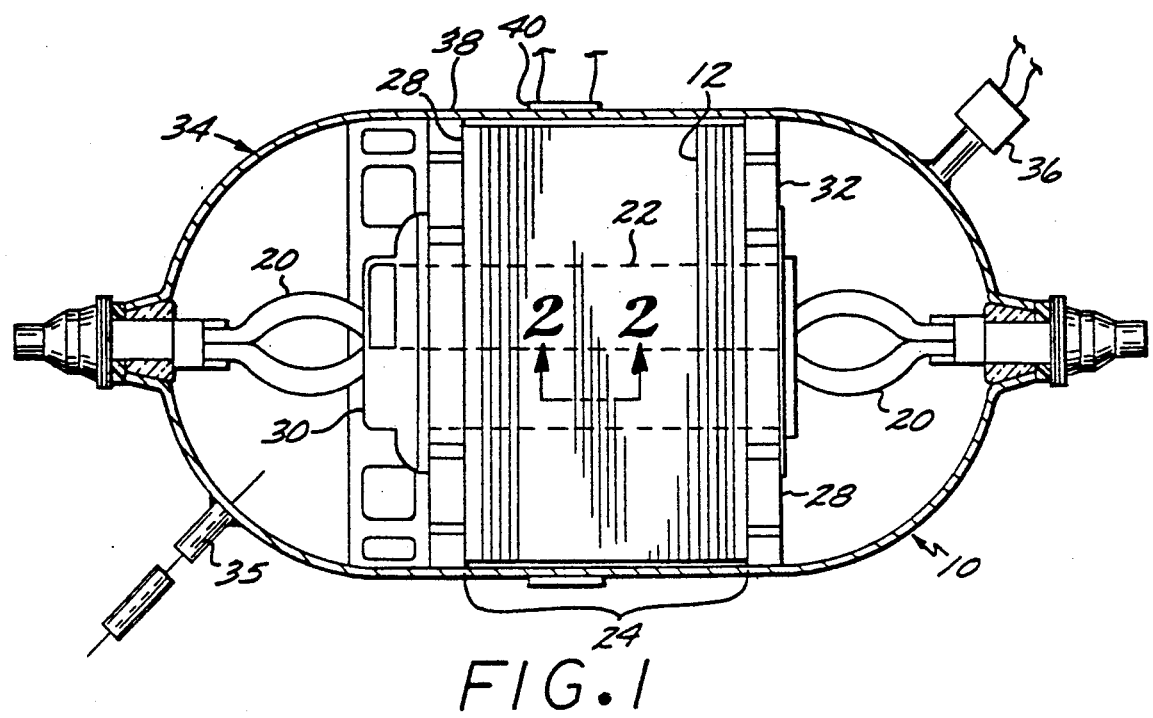
FIG. 1 is a sectional elevational view of a flight-type nickel-hydrogen cell.
Figure 2:
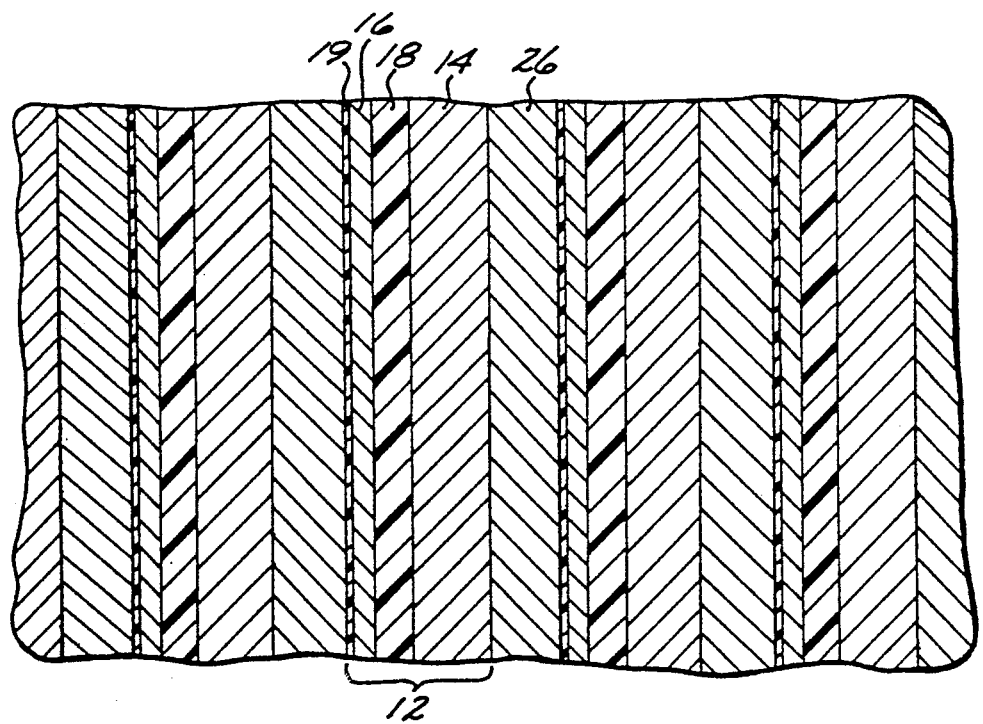
FIG. 2 is a sectional view of a detail of FIG. 1, taken generally on line 2—2, illustrating the plate sets.

The present invention relates to a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an anode or positive electrode 14, a cathode or negative electrode 16, and an electrolyte-containing separator 18, which physically separates the electrodes 14 and 16, and also supplies the electrolyte medium through which ionic and electron transfer occur. Charging and discharging of the plate set 12 are accomplished through electrical leads 20, which will be shown in more detail in FIGS. 3 and 4. Various constructions of nickel-hydrogen cells and components are disclosed in the following U.S. patents, whose disclosures are herein incorporated by reference: U.S. Pat. Nos. 4,683,178; 4,689,544; 4,283,844; 4,262,061; 4,250,235; 4,000,350; and 3,669,744.

The positive electrode 14 is formed by impregnating nickel hydroxide into porous sintered nickel that is supported on an nickel electrode substrate, which is a mesh or screen of nickel wires. The negative electrode 16 is coated on one side by a sintered mixture of platinum black and polytetrafluoroethylene, and on the other side with a porous layer of polytetrafluoroethylene 19. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte is impregnated into the electrodes 14 and 16, and the separator 18 in this flight-type cell.

The individual plate sets 12 are assembled onto a central core 22 to form a stacked array termed the plate stack 24. The core is typically a cylinder of polysulfone plastic. In forming the plate stack 24, a deformation element in the form of a deformable polypropylene screen 26 is placed between each plate set 12. The screen 26 performs two functions. First, it is porous so that oxygen liberated during overcharging at each positive electrode 14 can diffuse away from the electrode 14 and to the negative electrode 16 to combine with hydrogen. Second, the screen creeps when a sufficiently large compressive load and strain are applied in the direction parallel to the axis of the core.

Polypropylene was selected as the screen material because it is not degraded in the preferred potassium hydroxide electrolyte used in nickel-hydrogen batteries. Other acceptable, but less preferred materials, include polyethylene and teflon (polytetrafluoroethylene).

Nylon and polyester, for example, are not sufficiently stable in potassium hydroxide, and are not used for the screen material. If the approach of the invention is used in conjunction with another electrolyte, a suitable screen material may be selected that is stable in the electrolyte.

The controlled creep characteristics of the screen 26 are provided in either or both of two ways. First, the screen material itself may be changed, either to a completely different material, the same material whose properties have been modified as by an annealing heat treatment, or to a chemically modified version of the same material, as, for example, the same polymer that has been polymerized to a different extent.

Second, and more preferably, the physical screen characteristics may be altered to permit greater deformation. The physical characteristics of a screen can be defined by the type of weave, the mesh opening size, the thread diameter, and the weight per unit area of the screen. In the past it has been thought to be desirable to provide a screen that was nondeformable and creep resistant, so that the screen was highly resistant to deformation perpendicular to its face. Such a polypropylene screen had a twill weave, 0.0117 inch mesh opening size, 0.0157 inch fabric thickness, and a weight per unit area of 3.79 ounces per square yard. The preferred screen 26 for use in the present invention, where the external pressure imposed upon the plate stack is about 10 pounds per square inch, has a square weave, 0.0331 inch mesh opening size, 0.0291 inch fabric thickness, and a weight per unit area of 5.72 ounces per square yard. The use of this thicker, more open screen material permits the screen to deform during use a sufficient amount to accommodate the deformation imposed upon the plate stack 24 by the swelling of the nickel electrode. A suitable screen material must be selected for each particular application, as a material giving the proper amount of deformation in one circumstance may not give the proper amount in another circumstance.

Suitable screen materials are available from the commercial supplier Tetko, Inc., 420 Saw Mill River Road, Elmsford, N.Y.

The plate stack 24 is initially placed under an externally induced longitudinal pressure of, for example, about 10 pounds per square inch, by tightening compression plates 28 against each end of the stacked array 24. The tightening of the compression plates 28 is preferably accomplished by compressing the stack 24 and then tightening a nut 30 on threads on the core 22, thereby compressing a Belleville washer set 32 against the compression plate 28 to hold the plate stack 24 in place.

The plate stack 24 is sealed within a pressure vessel 34, manufactured of a material such as Inconel 718 nickel-based alloy which can withstand internal pressures on the order of 1,000 pounds per square inch (psi), without damage by hydrogen embrittlement or corrosion by the electrolyte. A fill tube 35 allows the pressure vessel 34 to be filled with electrolyte, and the initial cell precharge to be established. The pressure vessel 34 is typically constructed in the form of a cylindrical tube having domed ends. By way of illustration, the cell 10 having the pressure vessel 34 of external dimensions 3½ inches diameter and 13 inches long can contain about 40 individual plate sets 12, with a resulting electrical storage capacity of the cell of about 50 ampere-hours. The cell 10 may be charged and discharged through thousands of cycles without apparent physical damage to the components, if the charging and discharging are accomplished properly. A number of cells 10 are typically combined in a series, and possibly a parallel, arrangement to produce a battery with the required voltage and current delivery characteristics.

The cell 10 is normally instrumented to monitor its operational state. As the nickel-hydrogen cell is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be deduced by measuring a quantity which responds to pressure, specifically the deformation in the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34.

Charging is accomplished by impressing a voltage through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cells and the cycle dictated by the orbit of the spacecraft.

FIGS. 3 and 4 illustrate the functioning of the plate stack and deformable screen 26 of the present approach, FIG. 4, as contrasted with the functioning of the plate stack and nondeformable screen of the prior approach, FIG. 3. FIG. 3(a) depicts the initial state of a plate stack 50 of the prior approach, wherein a number of plate sets 52 are mounted on a core 54. A nondeformable screen 55 is mounted between each plate set 52, to permit escape of gas generated at the electrode. A positive electrode conductor lead 56 and a negative electrode conductor lead 58 extend from the ends of the core 54 to each plate set 52. There is one conductor lead 56 for each plate set 52, and one conductor lead 58 for each plate set 52, with the result that there are as many as about 40 of each of the leads 56 and 58 entering the core 54 at each end.

It is observed experimentally that the plate sets 52 each increase in thickness after repeated cycles of charging and discharging, FIG. 3(b). Relative to, and measured from, the fixed end 60, the final displacement $d_f$ of a plate set is greater than its initial displacement before cycling, $d_i$ in FIG. 3(a). The difference in displacement, $d_f-d_i$, acts to deform the core 54, potentially causing it to fail, and to cause bending and deformation of the leads 56 and 58. Because so many leads are bundled together, the bending and deformation of the leads 56 and 58 can result in short circuiting, as indicated schematically at numeral 62, and ultimately mechanical failure of the leads 56 and 58.

By contrast, and as shown in FIG. 4, a deformable element screen 26 is used in place of the nondeformable screen 55. The initial configuration of the plate stack is identical, FIG. 4(a). After cycling, FIG. 4(b), the plate sets 52 have grown thicker, but the deformable element screen 26 has become thinner as it creeps, so that the total thickness of each plate set plus associated deformable element screen is approximately constant. As a result, the final displacement of a plate set $d_f$ of FIG. 4(b) is approximately equal to the initial displacement $d_i$ prior to cycling, FIG. 4(a). There is therefore little or no excess load placed upon the core 54, and little or no crimping or deformation of the leads 56 and 58. This potential failure mechanism is therefore avoided, and the life of the cell is prolonged.

The use of nothing more than a Belleville washer or a spring at the end of the stack would not achieve the results of the present invention. The overall displacement at the end of the stack could be accommodated with such a means, but each individual plate set would still be displaced by the expansion of the positive electrode. The damaging internal deformations illustrated in FIG. 3(b) would still be present in such a configuration.

The present invention thus achieves the important benefit of lengthening of the life of the storage cell by substituting a deformable element, preferably the deformable element screen, into the structure of the plate stack. A deformable element is preferably placed between each plate set, and acts to release gas as well as accommodate deformation. However, other configurations can be used with deformable elements placed at greater intervals in the stack. Although a particular embodiment of the invention has been described in detail for purposes of illustration, various modifications may be made without departing from the spirit and scope of the invention. Accordingly, the invention is not to be limited except as by the appended claims.

What is claimed is:

1. An electrical storage cell having an extended life under conditions of repeated cycling between charged and discharged states, comprising:
   a plurality of active plate sets, each plate set including a nickel positive electrode, a hydrogen negative electrode and a separator between the positive electrode and the negative electrode;
   a core upon which the plate sets are supported under axial compressive loading;
   a deformable nonmetallic screen disposed between each of the plate sets on the core, the screen being compressively deformable to accommodate the permanent swelling in each of the plate sets that occur during extended cycling of the cell; and
   a pressure vessel that contains the plate sets, the core, and the deformable screen.

2. The storage cell of claim 1, wherein the deformable screen is a polypropylene screen.

3. The storage cell of claim 1, wherein the deformable screen is a polypropylene screen having from about 30 to about 40 percent open area.

4. An electrical storage cell having an extended life under conditions of repeated cycling between charged and discharged states, comprising:
   a plurality of active plate sets, each plate set including a positive electrode, a negative electrode, and a separator between the positive electrode and the negative electrode;
   a support upon which the plate sets are supported in a face-to-face relationship, under axial compressive loading; and
   accommodation means for accommodating deformation disposed between at least some of the plate sets on the core, said accommodation means including a nonmetallic screen that is deformable to accommodate the permanent expansion in the plate sets that occurs during extended cycling of the cell.

5. The storage cell of claim 4, wherein the deformable screen is a polypropylene screen.

6. A plate set stack used in an electrical storage cell, comprising:
   a plurality of active plate sets, each plate set including a positive electrode, a negative electrode, and a separator between the positive electrode and the negative electrode; and
   a deformable nonmetallic screen disposed between at least some of the plate sets, the screen being compressively deformable to accommodate the permanent swelling in each of the plate sets that occurs during extended cycling of the cell.

7. The plate set stack of claim 6, wherein the deformable screen is a polypropylene screen.

* * * * *